Patented Jan. 18, 1949

2,459,423

UNITED STATES PATENT OFFICE 2,459,423

REACTION OF ORGANIC COMPOUNDS WITH HYDROGEN HALIDES

Arthur Ira Gebhart, Union, N. J., assignor to Colgate-Palmolive-Peet Company, Jersey City, N. J., a corporation of Delaware No Drawing. Original application April 8, 1942, Serial No. 438,075. Divided and this application November 13, 1943, Serial No. 510,219

10 Claims. (Cl. 260—663)

The present invention relates to a novel process for preparing halogenated organic compounds and, more particularly, to a new method of hydrohalogenating unsaturated organic bodies.

Hydrohalogenation of organic compounds has always presented considerable difficulties to prior art investigators, and hydrobromination has been especially troublesome, both in the preparation of the hydrogen bromide and in its addition to unsaturated bonds. Thus, a common method of preparing hydrogen bromide has been to drop bromine upon a mixture of red phosphorus, water and sand and to pass the resulting vapors over moist red phosphorus spread over glass wool in a U-tube, a procedure which is both long and troublesome. The hydrogen bromide is then added directly or in solution in an organic solvent to an unsaturated compound, and the mixture frequently takes several hours in order to form the addition product. This addition procedure, besides being a tedious one, is generally unproductive either of good yields or of good quality of the product.

It is an object of the present invention to provide a new method for rapidly preparing good yields of halogenated organic compounds of high purity.

It is also an object of this invention to provide a novel process for adding anhydrous hydrogen halide, particularly anhydrous hydrogen bromide, to unsaturated organic aliphatic groups.

Other objects and advantages of the invention will be apparent from the following description.

According to the present invention, anhydrous hydrogen halide is contacted for a relatively short time with an unsaturated organic compound to be hydrohalogenated. Contact is advantageously effectuated in an inert, non-aqueous, polar medium, such as liquid sulphur dioxide, and the hydrogen halide, say hydrogen chloride or hydrogen bromide, is preferably formed in situ in the medium before contact with the organic compound. After hydrohalogenation, the liquid sulphur dioxide is removed, and the halogenated product is recovered.

The hydrogen halide (e. g., hydrogen bromide) is preferably employed in substantially anhydrous condition. A suitable method for preparing substantially anhydrous hydrogen halide has been described in the application (Serial No. 438,075 now Patent No. 2,339,330, issued January 18, 1944) of which the present case is a division. This method comprises contacting a halogen (e. g., bromine) dissolved in liquid sulphur dioxide with water to produce the hydrogen halide (e. g., hydrogen bromide) and sulphuric acid. In practice, a considerable excess of sulphur dioxide is advantageously used, the liquid sulphur dioxide preferably serving as a solvent for the bromine and for the hydrogen bromide formed. Chlorine may be similarly reacted to form anhydrous hydrogen chloride. It is preferred, especially when preparing hydrogen chloride by this method, that an amount of water be added at least sufficient to react with all free halogen present, as the presence of free chlorine in subsequent halogenations may give undesired side reactions. Sulphuric acid of concentration up to 100% has low solubility in liquid sulphur dioxide at 0° C. and lower and forms a separate lower layer which may be withdrawn, if desired, although the presence of sulphuric acid in the subsequent halogenation is frequently not disadvantageous. Indeed, in certain reactions, such as the esterification of an alcohol with hydrogen halide, the sulphuric acid may serve to remove water, thus assisting in completion of the reaction.

The process of the invention is applicable for hydrohalogenation, and especially for hydrobromination, of organic unsaturated compounds, particularly those of the olefinic and acetylenic types. These include unsaturated aliphatic hydrocarbons, acids, alcohols, aldehydes, ethers, ketones and the like, as well as derivatives of these compounds, including sulphonated, nitrated, halogenated, or aryl-substituted bodies, etc., and the like. Compounds satisfactory for hydrohalogenation by the present process include propylene, decene-1, 5-chlorpentene-2, crotonylene, isoprene, diallyl (hexadiene-1,5), allyl bromide, heptyne-1, styrene, vinyl acetylene, dehydro-undecylenic acid, beta-ethyl-acrylic acid, sorbic acid, linoleic acid, maleic anhydride, cinnamic acid, cyclopentadiene, allyl carbinol, citronellol, 1-nitroisobutylene-2, acrolein, propargylic aldehyde, crotyl ethyl ether, vinyl propyl ketone, mesityl oxide, phorone, indene, etc. The process of this invention is thus applicable for reacting a hydrogen halide with any organic compound capable of reacting with said hydrogen halide at similar temperatures.

In contacting the unsaturated organic compound with the liquid sulphur dioxide solution of hydrogen halide, it has been found convenient to run the organic compound, if liquid, into the sulphur dioxide solution while agitating, or, if the organic compound is gaseous, to bubble it through the sulphur dioxide solution. The organic compound, if solid, may be added directly to the liquid sulphur dioxide solution and may be dissolved or suspended therein, or it may be liquefied prior to admixture by the use of heat and/or of solvents. However, it will be understood from the foregoing that the mixture may also be made by running the sulphur dioxide solution of hydrogen halide into the organic compound to be hydrohalogenated, or the two bodies may be passed in countercurrent to each other in continuous operation. Such countercurrent contact is of particular convenience where the organic compound is gaseous and can be bubbled upward through a downwardly moving column of the sulphur dioxide solution of hydrogen halide. Similarly, although it is preferred to prepare the hydrogen halide in the manner disclosed, it is also contemplated that the unsaturated organic reactant may be dissolved in liquid sulphur dioxide and that the hydrogen halide may thereafter be added to the liquid sulphur dioxide solution thus formed. The hydrogen halide may be passed in the gaseous state into said solution or may be run into the solution in liquefied form or dissolved in liquid sulphur dioxide or in an organic solvent.

The organic reactants may advantageously be dissolved in another inert solvent for admixture with the sulphur dioxide solution of the hydrogen halide, especially where the reactant is insoluble or only slightly soluble in liquid sulphur dioxide. The reaction mixture may thus be of either one or two liquid phases, and it is preferred that the solvent selected be at least partly miscible with liquid sulphur dioxide. Suitable solvents or suspending media for the unsaturated organic reactant include butane, pentane, hexane, decane and other alkanes; carbon tetrachloride; chloroform, ethylene dichloride, ethyl bromide, dichloro-difluoromethane, and other halogenated hydrocarbons; cyclohexane, decalin, tetralin and other cycloaliphatics; benzene, toluene, the xylenes, naphthalene, diphenyl, nitrobenzene and other aromatic hydrocarbons together with their nitro-, halogeno-, and other derivatives; petroleum ether and gasoline; liquid carbon dioxide; liquid sulphur dioxide; ethyl ether; dioxane and other ethers; carbon disulphide; and the like, and mixtures thereof.

The contact of the organic reactant with the liquid sulphur dioxide solution of the hydrogen halide is preferably aided by agitation, especially where more than one phase is present. The time of contact varies appreciably, depending upon the compound to be hydrohalogenated, but it has been observed that high yields are obtainable with most reactants after about fifteen to about thirty minutes, and in some cases in even shorter time. Similarly, the proportions of the organic reactant to the hydrogen halide may vary widely, especially for different degrees of hydrohalogenation where poly-unsaturated or acetylenic groups are reacted. The reaction temperatures and pressures may also be varied within wide limits, again depending upon the compound to be reacted and the product to be formed. In general, it is preferred to carry out the reaction at temperatures around $-10°$ C. or below and at atmospheric pressure, although temperatures from about $-40°$ to about 70° C. or even higher (but below the critical temperature of sulphur dioxide) may be used. Likewise, either superatmospheric or reduced pressures may also be employed, the former being preferred when higher temperatures are used in order to keep the sulphur dioxide in the liquid state. When the operation is carried out at temperatures and pressures and/or under other conditions which remove substantial amounts of the sulphur dioxide through volatilization or otherwise, it is desirable to provide for the addition of sufficient liquid sulphur dioxide to the reaction mixture in order that the volume may be appropriately adjusted. In this manner, by regulation of the pressure, control of temperatures can be obtained.

After the reaction has progressed to the desired degree, the sulphur dioxide is removed from the reaction mixture. This may be accomplished by bubbling an inert gas, such as carbon dioxide, nitrogen, stack gases, etc., through the mixture, and/or by gradually pouring the mixture into ice water or upon ice, during which operation most of the liquid sulphur dioxide volatilizes, and/or by other means. Suitable equipment may be provided for carrying out these operations, whereby the volatility of the sulphur dioxide may be increased, as by reducing the pressure in the system. Such equipment may also be provided with condensers, whereby the volatilized sulphur dioxide and/or other solvent employed may be recovered for reuse. In many cases, the nature of the product formed is such that its temperature may be increased without deleterious effect, so that most or all of the remaining solvent may be removed from the reaction mixture by heating or the like. Known methods, including fractional distillation, fractional crystallization, extraction, and other separation procedures or any combination of these, may be employed for separating the product from the aqueous mass and/or from unreacted materials.

The effect of oxidation upon olefines and other unsaturated bodies is a deleterious one for the present purpose, since, in the presence of peroxides, olefines and substituted olefines give polymeric sulphones with sulphur dioxide. It has therefore been found to be of advantage to use freshly prepared and/or freshly distilled olefinic and acetylenic compounds substantially free from peroxides and/or to add anti-oxidants to the mixtures before hydrohalogenating. Suitable anti-oxidants include stannous chloride, hydroquinone, pyrocatechin, decahydronaphthalene, etc. By excluding substantially all peroxides and other oxidizing agents, it is possible to obtain a substantially homogeneous reaction product, as, when operating at the normally low temperatures of the present process, the addition of hydrogen bromide (or hydrogen chloride) generally follows Markownikoff's rule almost quantitatively, the negative radicle (Cl or Br) being attached to the carbon having fewer hydrogen atoms or the greater number of alkyl groups. Where, in certain cases, the reverse is desired, higher temperatures at increased pressures may be employed.

The following examples are given to illustrate the present invention, and it will be apparent that the invention is not limited thereto.

Example I

About 250 cc. of liquid sulphur dioxide is tapped from an inverted cylinder of sulphur dioxide into a cylindrical, unsilvered Dewar flask of about 1 liter capacity, open at the top, and provided with an electric stirrer and with a stop cock at its lower end. About 20 grams of bromine are added to the liquid sulphur dioxide and are dissolved therein, the sulphur dioxide vapors acting as a blanket to keep atmospheric oxygen and moisture out of the vessel. About 16 grams of water are then slowly added with stirring until the reddish brown color of the bromine is discharged. A lower layer of sulphuric acid collects at the bottom of the Dewar flask upon standing and is permitted to remain there.

About 25 grams of freshly distilled styrene is then run into the sulphur dioxide solution in the flask, and the mixture is stirred for about thirty minutes at about $-8°$ C. At the end of this period, substantially none of the hydrogen bromide remains in the sulphur dioxide solution. A current of carbon dioxide is then passed throuogh the reaction mixture to evaporate a major portion of the liquid sulphur dioxide, and the mixture is thereafter run into cracked ice and water. When most of the sulphur dioxide has volatilized, the residue is extracted with petroleum ether and is washed free of acids with water, the first portions of wash water used containing a small amount of sodium hydroxide. The petroleum ether is then evaporated to yield about 39.4 grams of alpha-bromoethylene as a colorless, harsh-smelling liquid. The product obtained distills at about $64°$ C. to about $66°$ C. at a pressure of 8 mm. of mercury, and the amount obtained is equivalent to about 86.5% of the calculated theoretical yield.

The structure of the product is confirmed by reacting a portion thereof with sodium acetate in acetic acid to form an acetate, which, after saponification, yields an alcohol boiling at about $201°$ C. The alcohol, by conversion to the 3,5-dinitrobenzoate melting at about $92°$ C. to $95°$ C., is proven to be alpha-phenylethyl alcohol. A portion of this alcohol is oxidized with chromic acid to obtain acetophenone, recognized by the semicarbazone melting at about $196°$ C. It thus appears that hydrogen bromide can be added to styrene, in accordance with the procedure of the present invention, and follows the Markownikoff rule to give alpha-bromoethylbenzene.

*Example II*

Employing a solution of about 25 grams of hydrogen bromide in about 150 cc. of liquid sulphur dioxide, such as has been prepared according to the disclosure of Example I, about 35 grams of freshly distilled cinnamic acid dissolved in ethyl ether are slowly added to said sulphur dioxide solution of hydrogen bromide during agitation. After the reaction is completed, the reaction mixture is slowly poured into ice water to evaporate sulphur dioxide, and the product is extracted with petroleum ether, dried and distilled. The product comprises bromophenylpropionic acid.

*Example III*

To a solution of about 40 grams of hydrogen bromide in about 250 cc. of sulphur dioxide at about $20°$ C. and at a pressure of about 4 atmospheres, about 55 grams of freshly distilled allyl bromide at about $20°$ C. is slowly added. The reaction mixture is agitated for about fifteen minutes. Nitrogen gas is then bubbled through the reaction mixture, which is then poured into ice water to volatilize the major portion of the sulphur dioxide, and thereafter the entire mass is distilled to remove residual sulphur dioxide, unreacted allyl bromide and water. The residue, boiling at about $140°$ C. to $142°$ C., comprises 1,2-dibrompropane.

*Example IV*

About 14 grams of freshly distilled acrolein are slowly added to a solution of about 25 grams of anhydrous hydrogen bromide in about 150 cc. of liquid sulphur dioxide in a Dewar flask. After about twenty minutes of stirring, the reaction is completed. The sulphur dioxide is removed from the reaction mixture, following the procedure set forth in Example I, and alpha-bromopropionaldehyde is recovered. A high yield is obtained, which is apparently ascribable to being able to maintain the reaction temperature at the low temperature of liquid sulphur dioxide and thus substantially to eliminate side reactions.

*Example V*

About 20 grams of chlorine are dissolved in about 250 cc. of liquid sulphur dioxide, and water is slowly added to form hydrogen chloride in situ. About 50 grams of indene are run into this solution, and the mixture is mechanically agitated for about thirty minutes. At the end of this time, the temperature is gradually increased, and the sulphur dioxide is distilled off. The reaction mass is then extracted with carbon tetrachloride and is further distilled, alpha-chlorindane being obtained therefrom.

*Example VI*

About 23 grams of freshly distilled propargyl alcohol are slowly added to an anhydrous solution of about 40 grams of hydrogen bromide in about 250 cc. of liquid sulphur dioxide. The mixture is stirred for about fifteen minutes, and the mixture is then poured into ice water. The aqueous mass is extracted with carbon tetrachloride and is distilled, bromo-allyl alcohol being obtained.

*Example VII*

An anhydrous solution of about 90 parts by weight of hydrogen bromide per hour dissolved in about 600 parts of liquid sulphur dioxide per hour are run slowly downward through a column. At a point above the lowest portion of the column, about 30 parts of ethylene per hour are passed into the column and are bubbled through the downwardly flowing solution. The reaction product is removed at the bottom of the column together with liquid sulphur dioxide, from which it is separated and recovered. The unreacted ethylene and volatilized sulphur dioxide are withdrawn at the top of the column. The product comprises ethyl bromide.

*Example VIII*

About 42 grams of freshly distilled ethylene oxide are mixed into an anhydrous solution of about 80 grams of hydrogen bromide in liquid sulphur dioxide. Following the procedure as set forth in Example I, ethylene bromohydrin is obtained as a product.

*Example IX*

About 50 grams of freshly distilled propyl cyanide are slowly added with stirring to an anhydrous solution of about 80 grams of hydrogen bromide in liquid sulphur dioxide. The procedure of Example I is followed, and a product comprised propyl imino-bromide is obtained.

The use of anhydrous hydrogen halide for these reactions is of considerable advantage in obtaining high yields and high quality of product. Liquid sulphur dioxide has many advantages as a solvent for the reactants, being inexpensive, easily removable, non-corrosive and noninflammable and having a low boiling-point. Close control of reaction temperatures, ordinarily unattainable or attainable only with great difficulty, can be easily maintained in liquid sulphur dioxide, especially with regulation of pressure.

Other reactions utilizing a hydrogen halide in liquid sulphur dioxide, and preferably anhydrous hydrogen halide prepared in the manner disclosed herein, may also be carried out. The same procedure as shown here for hydrohalogenation of various organic compounds can be followed, or such procedure may be modified, depending upon conditions to be met and operative expediency. Thus, hydrogen bromide in liquid sulphur dioxide may be employed in double decomposition and substitution reactions. Alkyl halides may be formed by contacting alcohols with a hydrogen halide in liquid sulphur dioxide. In like manner, hydroxyl substituted aliphatic acids may be added to solutions of a hydrogen halide in sulphur dioxide to form the corresponding halogen-substituted acids. Hydrogen bromide in liquid sulphur dioxide can also be used as an esterification catalyst for influencing the reaction of an organic carboxylic acid with an alcohol to form an ester. Similarly, aryl halides can be formed by reaction of a hydrogen halide in liquid sulphur dioxide with aryl diazonium halides in the presence of a suitable catalyst; thus, benzene diazonium chloride, when mixed with hydrogen bromide in the presence of liquid sulphur dioxide and cuprous bromide as a catalyst, gives a product comprising brombenzene.

Although the present invention has been described with reference to particular embodiments and examples, it will be apparent to those skilled in the art that variations and modifications of this invention can be made and that equivalents can be substituted therefor without departing from the principles and true spirit of the invention.

I claim:

1. The process of reacting organic compounds with a hydrogen halide which comprises intimately contacting a hydrogen halide from the group consisting of hydrogen chloride and hydrogen bromide with an organic reactant while at least one of said halide and said reactant is dissolved in liquid sulphur dioxide.

2. The process of reacting organic compounds with a hydrogen halide which comprises reacting a hydrogen halide from the group consisting of hydrogen chloride and hydrogen bromide with an unsaturated organic compound in liquid sulphur dioxide medium.

3. The process of reacting unsaturated organic compounds with hydrogen bromide which comprises mixing a solution of anhydrous hydrogen bromide in liquid sulphur dioxide with an unsaturated organic compound capable of adding hydrogen bromide, and removing sulphur dioxide from said mixture.

4. The process of reacting organic compounds with hydrogen bromide which comprises preparing a solution of anhydrous hydrogen bromide in liquid sulphur dioxide, intimately contacting said solution with an organic compound having an unsaturated aliphatic group capable of adding hydrogen bromide, and removing sulphur dioxide from said mixture.

5. In the process of hydrobrominating an unsaturated organic compound, the improvement which comprises intimately contacting said compound with anhydrous hydrogen bromide while at least one of said reactants is dissolved in liquid sulphur dioxide.

6. The improvement set forth in claim 5 wherein the unsaturated organic compound is freshly distilled.

7. The improvement set forth in claim 5 wherein the reactants are contacted in the presence of an anti-oxidant.

8. In the process of hydrobrominating an organic compound having an unsaturated aliphatic group, the improvement which comprises preparing a solution of anhydrous hydrogen bromide in liquid sulphur dioxide, mixing said solution with said organic compound, removing sulphur dioxide from said mixture to leave a residue, and recovering the addition product from said residue.

9. In the process of hydrochlorinating an organic compound having an unsaturated aliphatic group, the improvement which comprises preparing a solution of anhydrous hydrogen chloride in liquid sulphur dioxide, mixing said solution with said organic compound, removing sulphur dioxide from said mixture to leave a residue, and recovering the addition product from said residue.

10. In the process of hydrobrominating an organic compound having an unsaturated aliphatic group, the improvement which comprises preparing a solution of anhydrous hydrogen bromide in liquid sulphur dioxide, dissolving said organic compound in a substantially inert solvent at least partially miscible with liquid sulphur dioxide to form a second solution, intimately mixing said solutions, removing sulphur dioxide from said mixture to leave a residue, and recovering the addition product from said residue.

ARTHUR IRA GEBHART.

REFERENCES CITED

The following references are of record in the file of this patent:

UNITED STATES PATENTS

| Number | Name | Date |
| --- | --- | --- |
| 1,087,961 | Masland | Feb. 24, 1914 |
| 1,518,182 | Curms | Dec. 9, 1924 |
| 1,637,972 | Suida | Aug. 2, 1927 |
| 1,985,457 | Nutting et al. | Dec. 25, 1934 |
| 2,031,228 | Reilly | Feb. 18, 1936 |
| 2,099,480 | Hjerpe | Nov. 16, 1937 |
| 2,125,284 | Chamberlain et al. | Aug. 2, 1938 |
| 2,140,507 | Chamberlain | Dec. 20, 1938 |
| 2,244,512 | Brandt | June 3, 1941 |
| 2,284,467 | Ballard | May 26, 1942 |
| 2,339,330 | Gebhart | Jan. 18, 1944 |

OTHER REFERENCES

"Chemical Abstracts," vol. 17, page 748 (1923); abst. of article by Meerwein et al; ibid., vol. 29, col. 2465 (1935); abst. of article by Cornog et al. Smyth: "Dielectric Constant and Molecular Structure" (A. C. S. Monograph No. 55), pages 13, 191–3.